United States Patent
Manes (10) Patent No.: US 9,174,621 B2
(45) Date of Patent: Nov. 3, 2015

(54) LINEAR RAIL MAGNETIC BIASING FOR A STORAGE LIBRARY

(75) Inventor: Joseph Paul Manes, Arvada, CO (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 629 days.

(21) Appl. No.: 13/460,639

(22) Filed: Apr. 30, 2012

(65) Prior Publication Data

US 2013/0287533 A1 Oct. 31, 2013

(51) Int. Cl.
*F16C 29/02* (2006.01)
*B60T 13/74* (2006.01)
*B61H 7/00* (2006.01)
*F16C 29/10* (2006.01)

(52) U.S. Cl.
CPC .............. *B60T 13/74* (2013.01); *B60T 13/748* (2013.01); *B61H 7/00* (2013.01); *F16C 29/02* (2013.01); *F16C 29/10* (2013.01); *F16C 2226/18* (2013.01)

(58) Field of Classification Search
CPC ..... B60L 13/04; B60L 13/10; B60L 15/2009; B60T 13/74; B60T 13/748; B16H 7/00; B16H 7/02; B16H 7/04; B16H 7/0608; B16H 7/083; B16H 7/086; F16C 29/00; F16C 29/004; F16C 29/005; F16C 29/04; F16C 29/02; F16C 29/10; F16C 32/04; F16C 32/0406; F16C 32/044; F16C 32/0472; F16H 2226/18; H02K 41/00
USPC ......... 104/281; 188/38, 41, 43, 267; 198/619; 310/12.09, 12.11; 384/7, 8; 414/749.1, 414/749.2, 749.6, 800
See application file for complete search history.

(56) References Cited

U.S. PATENT DOCUMENTS

| | | | | |
|---|---|---|---|---|
| 1,756,921 A | * | 4/1930 | Ives et al. | 303/3 |
| 4,834,353 A | * | 5/1989 | Chitayat | 269/73 |
| 5,237,468 A | * | 8/1993 | Ellis | 360/92.1 |
| 5,394,069 A | * | 2/1995 | Danielson et al. | 318/371 |
| 5,497,057 A | * | 3/1996 | Danielson et al. | 318/371 |
| 6,827,022 B2 | * | 12/2004 | van den Bergh et al. | 104/284 |
| 8,746,416 B2 | * | 6/2014 | Gluck et al. | 188/44 |
| 2002/0073877 A1 | * | 6/2002 | Henderson | 104/281 |

* cited by examiner

*Primary Examiner* — Ernesto Suarez
*Assistant Examiner* — Brendan Tighe
(74) *Attorney, Agent, or Firm* — Marsh Fischmann & Breyfogle LLP; Daniel J. Sherwinter; Kevin J. Duffy (57) ABSTRACT

Systems and methods are described for providing magnetic biasing of a carriage in context of linear guides. In one embodiment, a robotic mechanism is configured to travel on a platform assembly within a structural context. The platform assembly transports a carriage in a Z direction, and the carriage transports the robotic mechanism in an X direction. The carriage moves in the X direction along rails (e.g., and/or other types of linear guides) in a substantially floating or unbiased manner. For example, one or more alignment features on the carriage are in communication with the rails to allow the carriage to move relatively freely within an alignment region defined by the alignment features. When the carriage reaches its desired X location, magnetic features bias the carriage into a substantially accurate, secure, and repeatable position.

20 Claims, 9 Drawing Sheets

LINEAR RAIL MAGNETIC BIASING FOR A STORAGE LIBRARY

FIELD

Embodiments relate generally to data storage systems, and, more particularly, to magnetic biasing of robot mechanisms in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

To operate properly, the robotic mechanisms are expected to reliably (e.g., repeatably and accurately) and rapidly find, retrieve, and deliver desired cartridges throughout the storage library cartridge inventory. This functionality can be facilitated by configuring the robotic mechanism to move a hand assembly in at least three axes (e.g., x, y, and z directions, and sometimes one or more of pitch, roll, or yaw), and to include one or more sensors to reliably detect the position and/or orientation of the hand assembly. When in its desired location, the hand assembly is activated to reliably grip the desired cartridge and remove it from a magazine or drive, or to reliably release the cartridge into a desired magazine slot or drive.

In many implementations, it is desirable for the robotic library to have free running mechanisms to glide smoothly between locations. However, it may be necessary to securely station the robotic mechanism in its desired location to repeatably and reliably perform certain types of operations, such as pick and place operations. Accordingly, implementations of robotic mechanisms may include complex designs to facilitate the two-state operation where the robotic mechanism can move in a substantially frictionless manor and park in a substantially locked manner.

BRIEF SUMMARY

Among other things, systems and methods are described for providing magnetic biasing of a robotic mechanism carriage. In one embodiment, a robotic mechanism is configured to travel on a platform assembly within a structural context of a data storage library. The platform assembly transports a carriage in a Z direction, and the carriage transports the robotic mechanism in an X direction. The robotic mechanism can move in other directions (e.g., rotate about a wrist and/or extend and retract) to perform functions, such as pick and place operations. The carriage moves in the X direction along rails (e.g., and/or other types of linear guides) in a substantially floating or unbiased manner. For example, one or more alignment features on the carriage are in communication with the rails to allow the carriage to move relatively freely within an alignment region defined by the alignment features. When the carriage reaches its desired X location, magnetic features bias the carriage into a substantially locked and repeatable position.

According to one set of embodiments, a system is provided for selectively biasing a carriage in context of linear guides. The system includes a linear guide that extends in an X direction and a carriage configured to travel along the linear guide in the X direction. The carriage includes: an alignment feature configured to form a relatively low-tolerance engagement between the carriage and the linear guide in at least a Y direction orthogonal to the X direction while the carriage is traveling along the linear guide in the X direction; and a biaser configured to magnetically couple the carriage with the linear guide in such a way that forms a relatively high-tolerance engagement between the carriage and the linear guide when the carriage is not traveling along the linear guide in the X direction.

According to another set of embodiments, a method is provided for selectively biasing a carriage. The method includes: moving a carriage in an X direction to a desired X location with respect to a platform, the platform having a linear guide and the carriage having an alignment feature configured to form a relatively low-tolerance engagement between the carriage and the linear guide in at least a Y direction orthogonal to the X direction while the carriage is traveling along the linear guide in the X direction; and upon reaching the desired X location, magnetically coupling the carriage with the linear guide in such a way that forms a relatively high-tolerance engagement between the carriage and the linear guide when the carriage is not traveling along the linear guide in the X direction.

According to yet another set of embodiments, a system is provided for selectively biasing a carriage. The system includes: guide means and carriage means for transporting a mechanism along the guide means in an X direction. The carriage means include: alignment means for forming a relatively low-tolerance engagement between the carriage means and the guide means while the carriage is traveling in the X direction; and biasing means for magnetically forming a relatively high-tolerance engagement between the carriage means and the guide means when the carriage is not traveling in the X direction.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
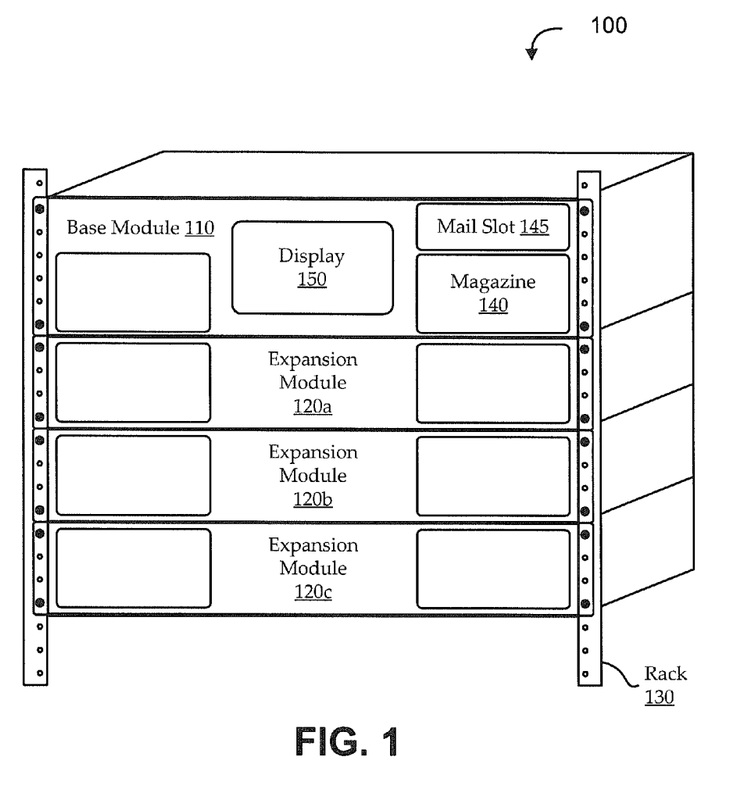
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figures 2A, 2B:
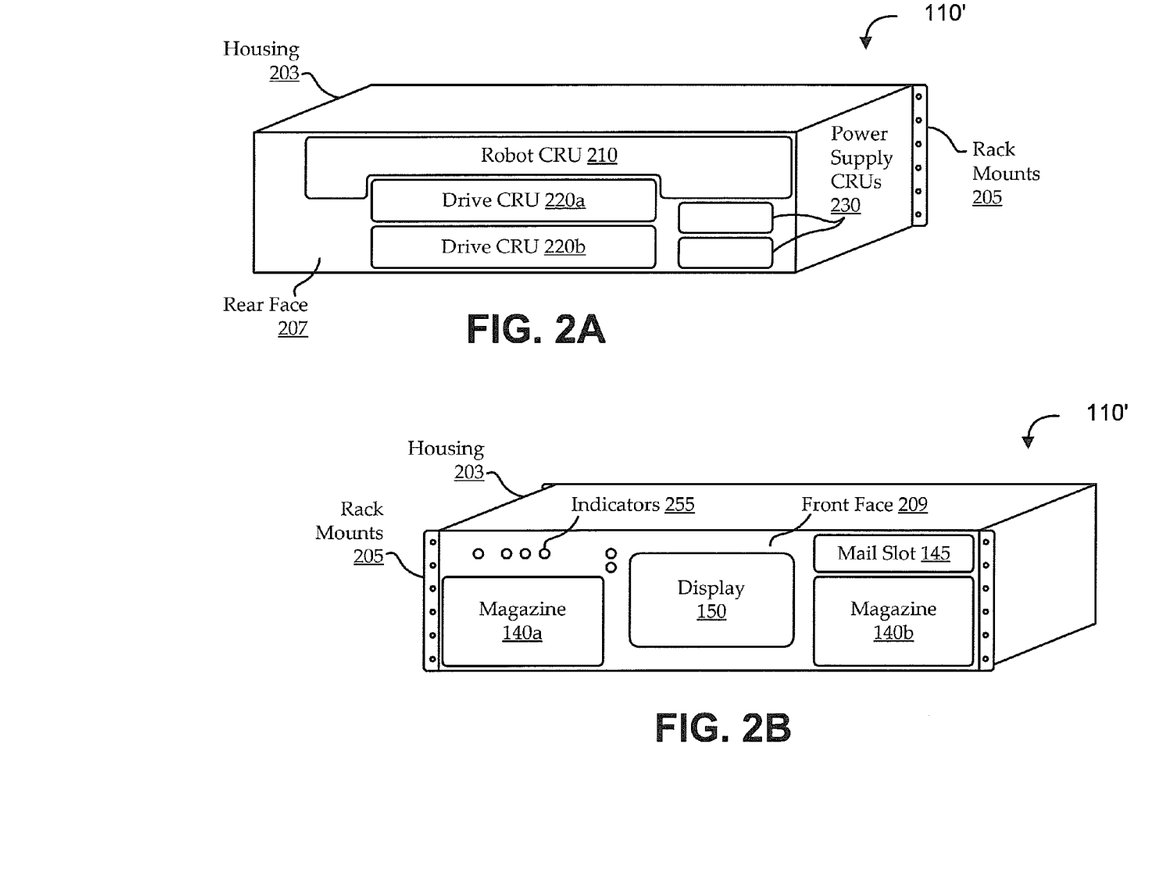
FIGS. 2A and 2B show rear and front views, respectively, of an illustrative base module, according to various embodiments.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, 10 functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
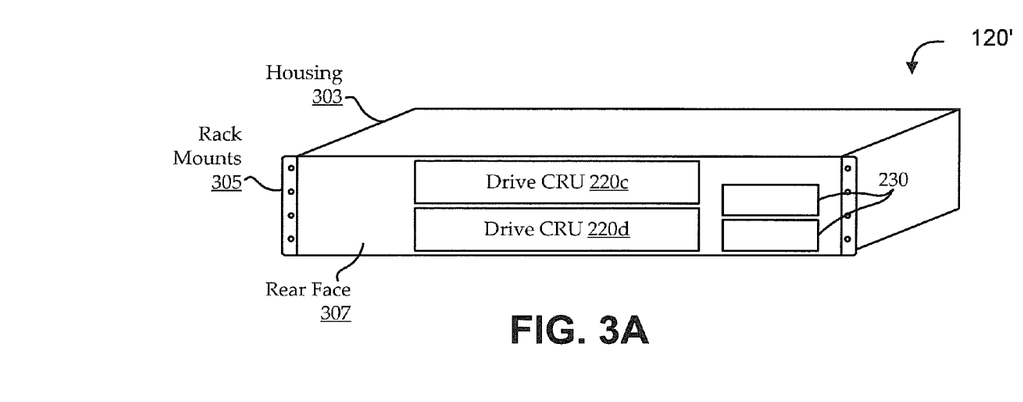
FIGS. 3A and 3B show rear and front views, respectively, of an illustrative expansion module, according to various embodiments.
Figure 3B:
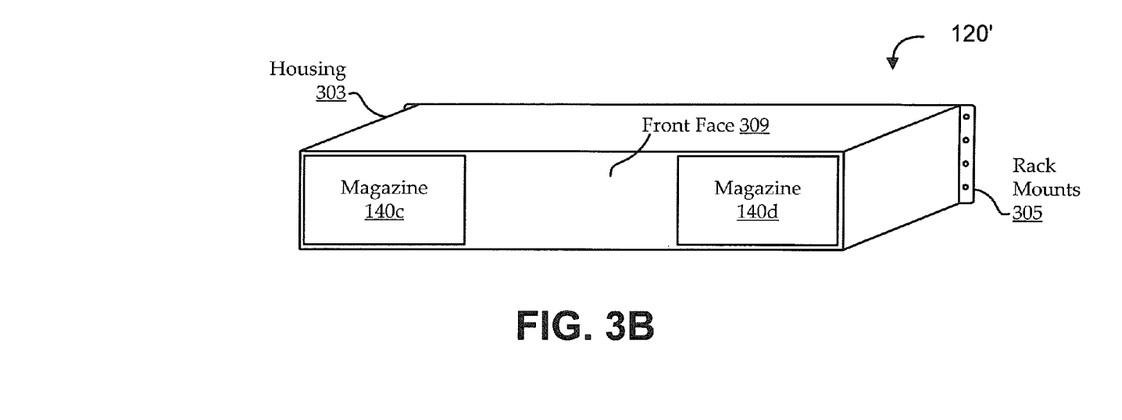

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
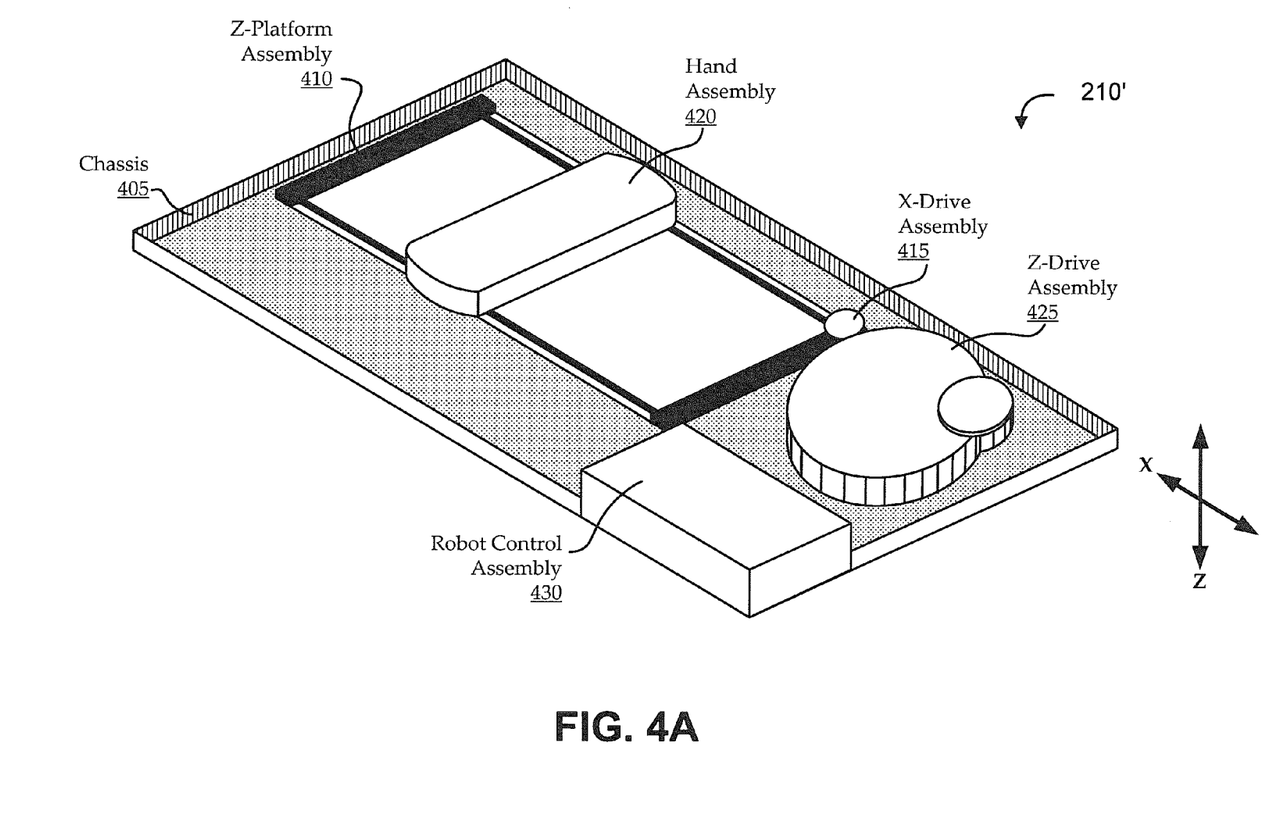
FIG. 4A shows a view looking down on the underside of an illustrative robot CRU (customer replaceable unit), according to various embodiments.
Figure 4B:
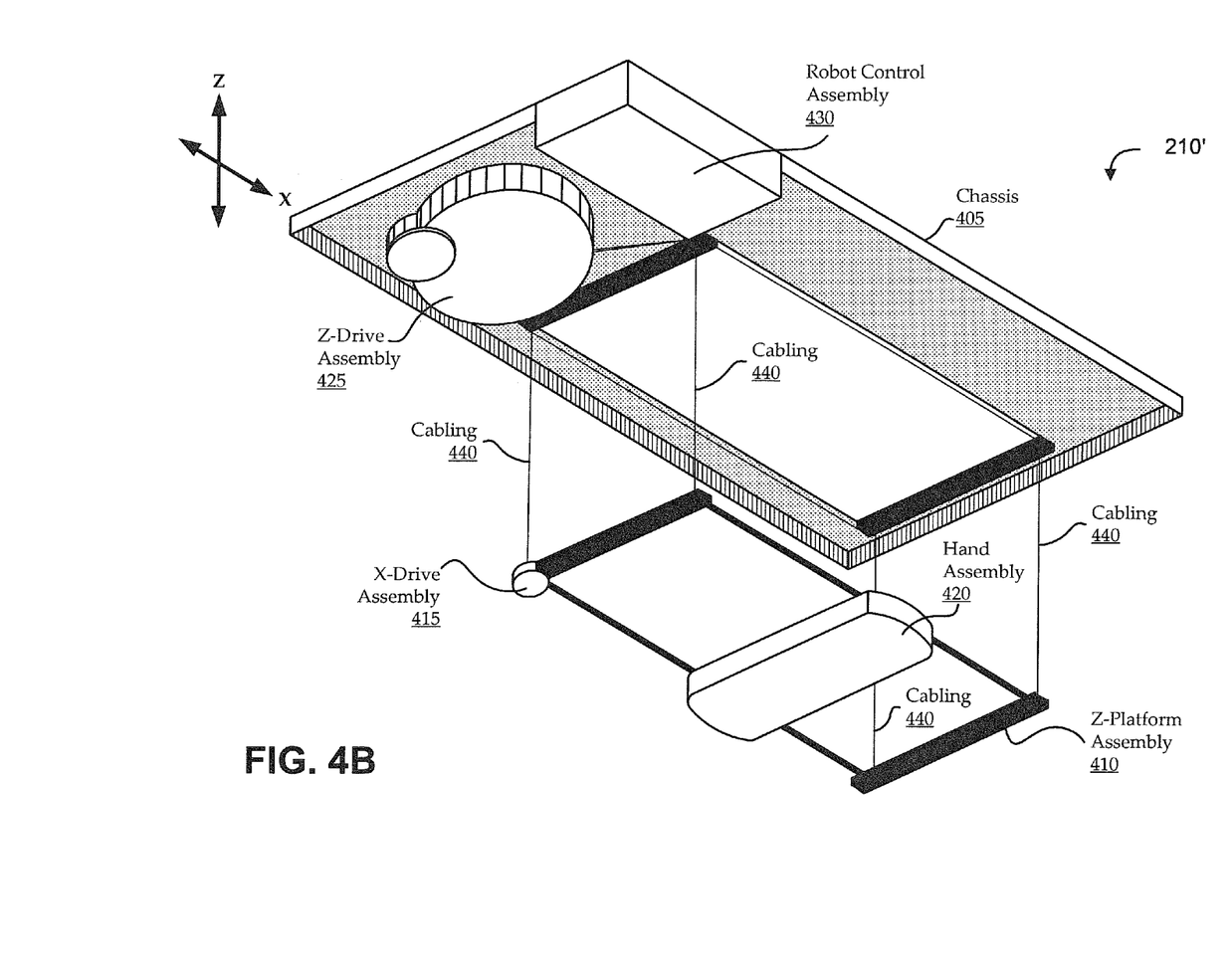
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a framework having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

It will be appreciated that in many contexts, such as in the context of a data storage library, it is desirable to effectively park the hand assembly 420 in a sufficiently accurate (e.g., predictable, stable, and repeatable) position. This type of position may be important for reliably performing operations, such as pick and place operations. Various techniques can be used to place the Z-platform assembly 410 in a desired Z location that is sufficiently accurate. However, accurate positioning of the hand assembly 420 may further involve sufficiently accurate positioning in a desired X location.

Some traditional techniques use relatively complex drive mechanisms (e.g., gears, bearings, belts, cams, actuators, sensors, etc.) to maintain accurate positioning in the X direction. These techniques can add cost and/or complexity to the implementation. Further, some of these techniques can be prone to issues, including, for example, failure, wear, etc. It may be desirable, instead, to allow the hand assembly 420 to be in a relatively unencumbered (e.g., relatively low tolerance) state while moving to a desired X location and in a relatively secure (e.g., accurate and stable, relatively high tolerance) state when the desired X location is reached. Embodiments use magnetic biasing to allow the X-drive assembly 415 to move a carriage (e.g., the hand assembly 420) in a relatively unencumbered manner to a desired X location and then to effectively park the hand assembly 420 in the desired X location with sufficient accuracy and stability.

Figure 5:
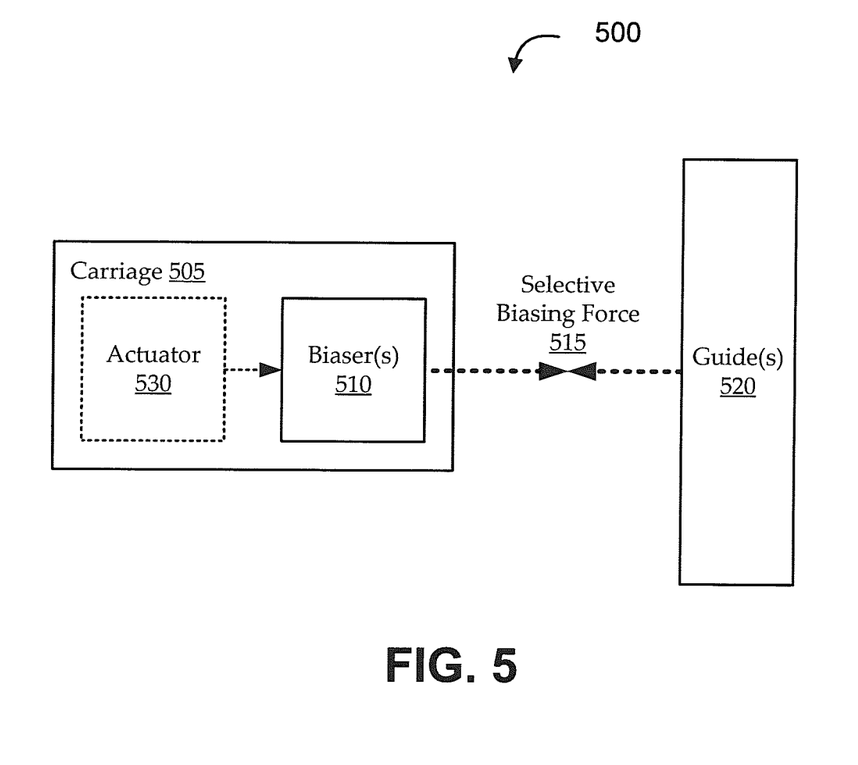
FIG. 5 shows a block diagram of an illustrative environment for selectively biasing a carriage 505, according to various embodiments.

FIG. 5 shows a block diagram of an illustrative environment 500 for selectively biasing a carriage 505, according to various embodiments. The selective biasing environment 500 may be implemented as the Z-platform assembly 410, and the carriage 505 may be implemented as the hand assembly 420. Embodiments of the carriage 505 are configured to travel in and ask direction along one or more guides 520. The carriage 505 includes one or more biasers 510 configured to exert a selective biasing force 515 on the one or more guides 520 to effectively park the carriage 505 in an X location on the one or more guides 520. Typically, the selective biasing force 515 is a magnetic force, and each of the one or more biasers 510 includes a permanent magnet or an electromagnet configured to produce the magnetic force.

As described above, embodiments are configured so that the carriage 505 is allowed to move in the X direction along the guides 520 in a manner that is substantially unencumbered by the selective biasing force 515. When a desired X location is reached, however, the biasers 510 are configured to effectively secure the carriage 505 in the desired X location through the exertion of the selective biasing force 515 on the one or more guides 520. In some implementations, the selective biasing force 515 is of a magnitude that is strong enough to effectively hold the carriage 505 securely in its desired X location, but weak enough to allow the carriage 505 to be easily decoupled from the guides 520 by applying an X directional force on the carriage 505. In other implementations, the biasers 510 include one or more electromagnets that can be adjusted to selectively apply the biasing force 515, as desired. In implementations using electromagnets, an actuator 530 can also be included as part of the carriage 505. The actuator 530 can be used to turn the electromagnets on or off, to increase power to the electromagnets, and/or to otherwise adjust the magnetic force being produced by the electromagnets.

Figures 6A, 6B:
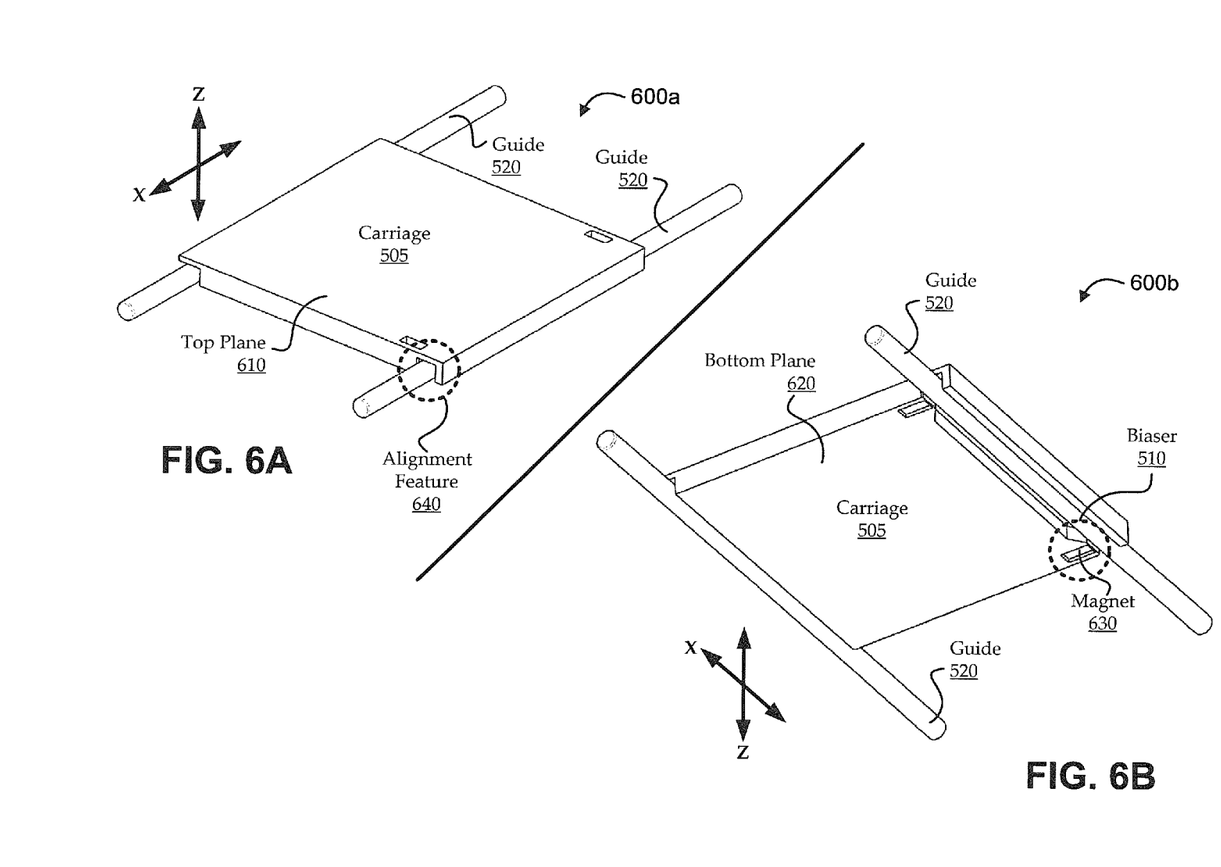
FIGS. 6A and 6B show a top view and a bottom view of an illustrative platform system, respectively, according to various embodiments.
Figure 7:
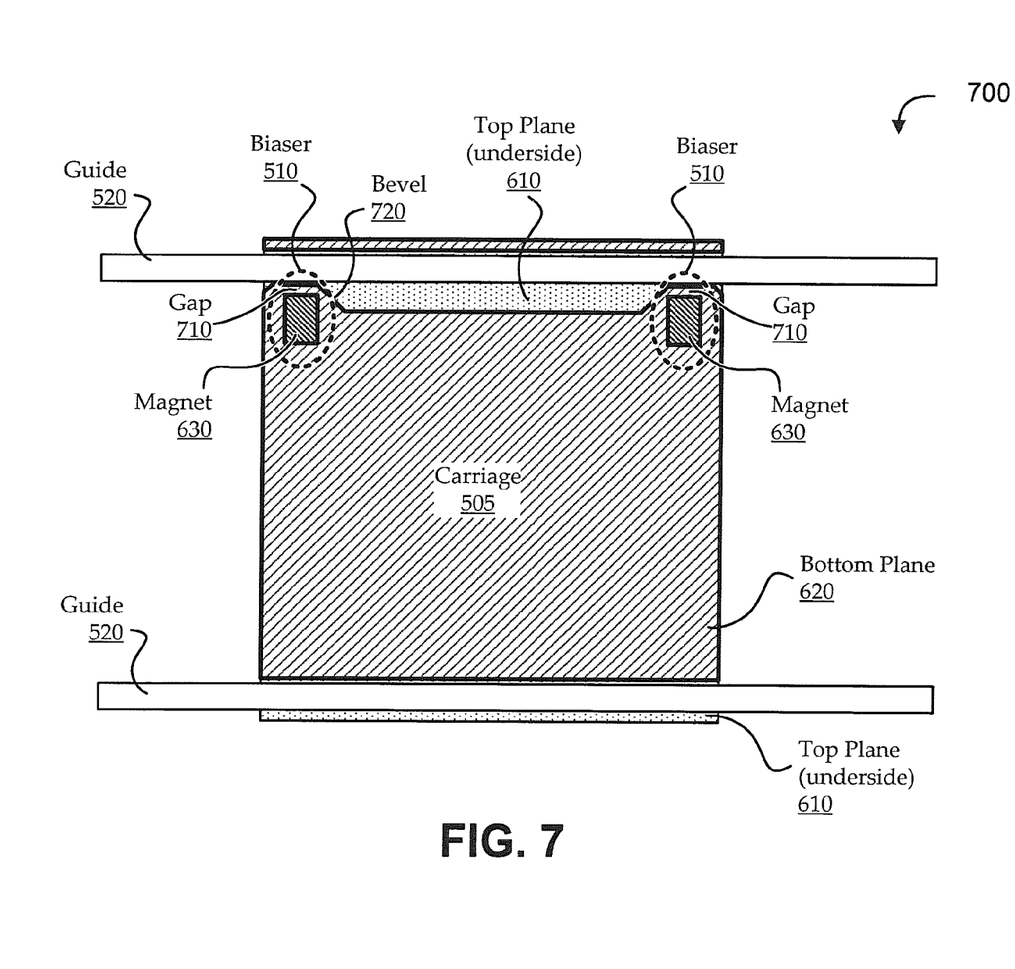
FIG. 7 shows a bottom view of an illustrative platform assembly, like the platform assemblies illustrated in FIGS. 6A and 6B.

There are many ways to implement the selective biasing environment 500, including many different embodiments of carriages 505, biasers 510, guides 520, actuators 530, etc. Some embodiments are illustrated in FIGS. 6A, 6B, and 7, which include various implementation details. It will be appreciated, however, that those details are intended only to be illustrative and should not be construed as limiting the scope of the invention.

Turning to FIGS. 6A and 6B, a top view and a bottom view of an illustrative platform system 600 are shown, respectively, according to various embodiments. The platform system 600 includes a carriage 505 configured to move along two guides 520 in an X direction. As illustrated, each guide 520 is configured as a rail of substantially constant cross-section (e.g., cylindrical or some other extruded shape). Embodiments of the guides 520 are manufactured of, or include, magnetic material. For example, the guides 520 may be made of steel or another material susceptible to magnetic forces.

For the sake of simplicity, the carriage 505 is shown as having a top plane 610 and a bottom claim 620. The top plane 610 generally refers to the portion of the carriage 505 that sits atop the guides 520, and the bottom plane 620 generally refers to the underside of the carriage 505. The carriage 505 has one or more alignment features 640 that are configured to loosely engage with one or more of the guides 520. For example, as shown, the carriage 505 is shaped so that a cavity is formed between the bottom plane 620 and top plane 610 that is at least large enough to partially surround one of the guides 520.

The cavity acts as an alignment feature 640 that effectively holds the carriage within a relatively low tolerance alignment region on the guide 520. The alignment feature 640 can also be configured to minimize any encumbrances on the movement of the carriage 505 in the X direction. For example, the alignment feature 640 can be shaped to have minimal contact with the guide (e.g., the illustrated square cross-section of the cavity may have less contact with a circular cross-section guide 520 then if the cavity were to also have a circular cross-section). Similarly, the alignment feature 640 can be tapered, beveled, rounded, or otherwise shaped to minimize encumbering contact between the carriage 505 and the guide 520. Further, the alignment feature 640 can include materials and/or other components to minimize friction and/or other encumbrances. For example, the cavity could be coded in a low friction material, include wheels or bearings, etc.

The loose engagement between the carriage 505 and the one or more guides 520 via the alignment feature 640 can allow the carriage 505 to effectively float in at least one direction (e.g. at least a direction orthogonal to the direction of travel) while it moves in the X direction. As described above, however, it is desirable to effectively park the carriage 505 securely against the one or more guides 520 when a desired X position has been reached. Accordingly, the carriage 505 has one or more biasers 510 configured to bias the carriage 505 into a secure and accurate position. As illustrated, the carriage 505 includes two biasers 510, each having a magnet 630. The magnet 630 can be a permanent magnet, an electromagnet, or a combination thereof. The biasers 510 are configured so that the carriage 505 is relatively unencumbered by the magnets 630 while moving in the X direction, but sufficiently secured by the magnets 630 to park the carriage 505 while not moving in the X direction (e.g., and in a desired X position). In this way, the biasers 510 magnetically couple the carriage 505 with at least one guide 520 in such a way that forms a relatively high tolerance engagement between the carriage 505 and the guide 520 at least one the carriage is not traveling in the X direction.

In some embodiments, the biasers 510 include a permanent magnet that generates a magnetic force. The magnetic force is configured to be strong enough to magnetically couple the carriage 505 with the guide 520 to effectively park the carriage in a substantially fixed position whenever the carriage 505 is not traveling in the X direction. The magnetic force is further configured to be weak enough so that a relatively small amount of force applied in the X direction will decouple the carriage 505 from the guide 520 to allow relatively unencumbered X-directional movement of the carriage 505 along the guide 520. In some implementations, the strength of the magnetic force is set by selecting a magnet that produces a magnetic force of a particular strength (e.g., or at least, or at most, some particular strength) and by positioning the magnet some particular distance from the guide 520 (i.e., to form a magnetic gap).

In other embodiments, the biasers 510 include an electromagnet that generates a magnetic force when actuated or generates a range of magnetic forces according to an amount of power supplied to the electromagnet. As described above, these embodiments may further include an actuator configured to selectively actuate the electromagnet to magnetically couple the carriage 505 with the guide 520 so as to form the relatively high tolerance engagement therebetween when desired. In some implementations, the actuator is further configured to detect when the carriage is at a desired X location and to selectively actuate the electromagnet in response to the detection. According to various embodiments, actuating the electromagnet may involve turning the electromagnet on, adjusting power supplied to the electromagnet, etc.

Embodiments may be configured to use electromagnets in different ways. In some embodiments, the electromagnets are used substantially as permanent magnets; they are maintained in an actuated state and produce a magnetic force similar to the one described above with reference to the permanent magnet embodiments. In other embodiments, the electromagnets are turned on when parking the carriage 505 is desired, and electromagnets are turned off while the carriage 505 undergoes X-directional movement. In still other embodiments, power to the electromagnets is increased to produce a sufficiently strong electromagnetic force for parking the carriage 505 when desired, and power to the electromagnets is decreased to effectively decouple the carriage 505 from the guides 520 while the carriage 505 undergoes X-directional movement.

FIG. 7 shows a bottom view of an illustrative platform assembly 700, like the platform assemblies 600 illustrated in FIGS. 6A and 6B. The platform assembly 700 includes a carriage 505 configured to move along to guides 520. In the bottom view shown in FIG. 7, the bottom plane 620 of the carriage 505 is visible, and portions of the underside of the top plane 610 of the carriage 505 are also visible. The carriage 505 may be configured to engage with the guides 520 according to one or more alignment features. As illustrated, the alignment features may include bevels 720 or the like to reduce encumbrances on X-directional movement of the carriage 505 along the guides 520.

As described above, the carriage 505 includes one or more biasers 510. Each biaser 510 includes a magnet 630 configured to exert a magnetic force on at least one of the guides 520. As illustrated, implementations position the magnet 630 at some distance from the guide 520 so as to form a gap 710. According to various embodiments, the gap 710 may be an air gap, or a gap between the magnet 630 and the guide 520 maintained by structure of the carriage 505. For example, the carriage 505 structure is configured to define a cavity for each magnet 630, so that when each magnet 630 sits inside its respective cavity, surrounding structure of the carriage 505 maintains the gap 710 between the magnet 630 and the guide 520.

For the sake of illustration, the platform assembly 700 may be a portion of an illustrative Z-platform assembly 410. Referring, for example, to FIG. 4B, the Z-platform assembly 410 suspends on cabling 440 from a chassis 405. The Z position of the Z-platform assembly 410 is adjusted using the Z-drive assembly 425, allowing the Z-platform assembly 410 to be vertically positioned in context of a structural framework (e.g., a storage library environment) as desired. When the desired Z position is reached, one or more techniques can be used to effectively park the Z-platform assembly 410 in place. Some embodiments for parking the Z platform assembly 410 in a desired Z position are described in U.S. patent application Ser. No. 13/350,437, filed on Jan. 13, 2012, titled "SELECTIVELY BIASED ROBOT MECHANISM PLATFORM FOR A STORAGE LIBRARY," which is hereby incorporated by reference herein for all purposes. This may include parking the Z-platform assembly 410 in some or all of the X, Y, and Z directions. Even though the Z-platform assembly 410 may be parked, as discussed herein, the hand assembly 420 (i.e., the carriage 505) may still substantially floating in context of the Z-platform assembly 410 structure. Allowing the hand assembly 420 to substantially float may allow the X-drive assembly 415 to more efficiently move the hand assembly 420 in the X direction along structure of the Z-platform assembly 410. When the hand assembly 420 reaches its desired X position, the hand assembly 420 can also be parked in a secure position with respect to the Z-platform assembly 410. With the Z-platform assembly 410 parked in context of the structural framework (e.g., the storage library), and the hand assembly 420 parked in context of the Z-platform assembly 410, mechanisms of the hand assembly 420 can be used to reliably perform operations that depend on accurate, secure, and repeatable positioning.

Figure 8:
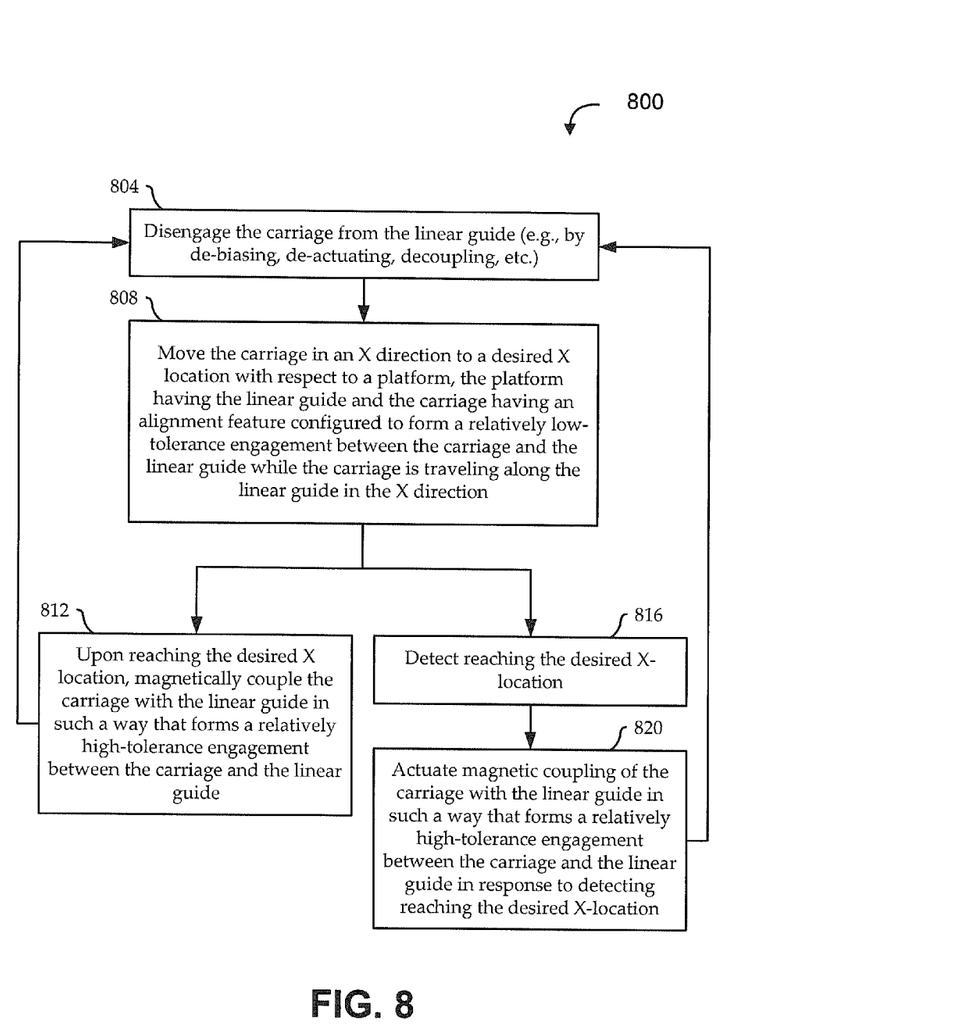
FIG. 8 shows a flow diagram of an illustrative method for magnetically biasing a carriage in a desired X location, according to various embodiments.

FIG. 8 shows a flow diagram of an illustrative method 800 for magnetically biasing a carriage in a desired X location, according to various embodiments. As described above, the carriage may be or may include him mechanism for performing certain types of operations that rely on accurate positioning. For example, the carriage may be or may support a hand assembly or other robotic mechanism configured to perform pick and place operations. In some embodiments, the carriage is implemented in context of the platform, second carriage, or other structure configured to move the carriage in directions other than the X direction. For example, carriage may be part of a larger structural assembly, like a data storage environment or the like.

Embodiments of the method 800 begin at stage 804 by disengaging a carriage from a linear guide. As described above, disengaging the carriage may involve overcoming magnetic forces by using X directional movement. Alternatively, disengaging the carriage may involve de-actuating components that are applying a magnetic biasing force. While disengaged, the carriage can move along the linear guide in a substantially unencumbered manner in the X direction.

At stage 808, the carriage is moved in the X direction to a desired X location with respect to a platform. The linear guide is part of the platform, and the carriage has one or more alignment features configured to form a relatively low tolerance engagement between the carriage and the linear guide. For example, the carriage includes an alignment feature that at least partially surrounds the linear guide to form an alignment region in which the carriage can substantially float in at least a direction orthogonal to the X direction (e.g., when no magnetic biasing forces being applied). In different embodiments, the alignment features can be implemented to form alignment regions of different tolerances. For example, in some implementations, the alignment region allows a small amount of float, though still too much float for the positioning of the carriage to be sufficiently accurate for desired operations. Further, some implementations use additional forces to secure the carriage in one or more directions. For example, some embodiments described above show the carriage effectively resting on the guides of the platform under the force of gravity.

As discussed above, the selective biasing force (e.g., the magnetic force) can be applied in many different ways. In some embodiments, the selective biasing force is applied in an effectively passive manner. At stage 812, upon reaching the desired X location, the carriage becomes biased into a substantially fixed position. Biasers in the carriage magnetically couple the carriage with the linear guide in such a way that forms a relatively high tolerance engagement between the carriage and the linear guide. For example, tuning the strength of the magnetic coupling force, strategically positioning magnetic elements, or other techniques can be used so that the biasing force automatically becomes "applied" when the carriage reaches its desired X location (e.g., when the carriage stops moving in the X-direction). According to these and/or other techniques, the magnetic force is designed to be strong enough to secure the carriage in the desired X location when the carriage is not moving, but weak enough to allow easy disengagement of the carriage from the guide by applying X-directional force to the carriage.

In other embodiments, the selective biasing force can be applied more actively. For example control signals, sensor feedback, and/or other techniques can be used to actively actuate components that applied the selective biasing force.

At stage 816, embodiments detect that the carriage has reached the desired X location. This detection can involve feedback from sensors, completion of a prescribed movement, etc. At stage 820, in response to detecting that the platform has reached the desired X location, the selective biasing force is actuated. As described above, the actuation can involve turning on an electromagnet, increasing power to the electromagnet, etc.

Whether by techniques such as those of stage 812 or such as those of stage 820, the carriage is effectively parked by those respective stages. Accordingly, these techniques can be used to create a stable platform environment from which to perform various types of functions, for example, various robotic mechanism operations. In some embodiments, the method 800 continues from either of stage 812 or 820 by returning to stage 804 when the next X-directional movement of the platform is desired. When returning from stage 812 to stage 804, embodiments may disengage the carriage by applying an X-directional force to the carriage to cause the magnetic coupling between the carriage and the linear guide to be broken. When returning from stage 820 to stage 804, embodiments may disengage the carriage by de-actuating the magnetic coupling.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims. It will be appreciated that, though particular directions (e.g., "Z" and "X") are discussed herein, those directions are intended only to be illustrative and should not be construed as limiting the scope of embodiments. For example, it is not intended that the X, Y, and Z directions are necessarily orthogonal to each other, that positive values necessarily connote a particular direction along an axis, etc., except where otherwise explicitly stated.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one" of indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for selectively biasing a carriage in context of linear guides, the system comprising:
    a linear guide that extends in an X direction; and
    a carriage configured to travel along the linear guide in the X direction, the carriage comprising:
        an alignment feature configured to form a relatively low-tolerance engagement between the carriage and the linear guide while the carriage is traveling along the linear guide in the X direction, such that the carriage is supportively engaged in adjacent contactable relation with the linear guide in a Z direction and is permitted to float relative to the linear guide in a Y direction, the X, Y, and Z directions being orthogonal to each other; and
        a biaser configured to magnetically shift the carriage in the Y direction relative to the guide means and to magnetically couple the carriage with the linear guide in such a way that forms a relatively high-tolerance engagement between the carriage and the linear guide to park the carriage in a substantially fixed position relative to the linear guide when the carriage is not traveling along the linear guide in the X direction.

2. The system of claim 1, wherein:
the biaser produces a magnetic force that is weak enough to decouple the carriage from the linear guide when an X-directional force is applied to move the carriage in the X direction.

3. The system of claim 1, wherein the carriage is configured to maintain a magnetic gap between the biaser and the linear guide.

4. The system of claim 1, wherein the biaser comprises an electromagnet.

5. The system of claim 4, further comprising:
an actuator configured to selectively actuate the electromagnet to magnetically couple the carriage with the linear guide in such a way that forms the relatively high-tolerance engagement between the carriage and the linear guide.

6. The system of claim 5, wherein the actuator is further configured to detect when the carriage is at a desired X location, and to selectively actuate the electromagnet in response to detecting that the carriage is at the desired X location.

7. The system of claim 1, wherein the alignment feature defines a cavity in the carriage that partially surrounds the linear guide in such a way as to form the relatively low-tolerance engagement between the carriage and the linear guide in at least the Y direction.

8. The system of claim 1, further comprising:
a platform assembly comprising:
a framework subassembly that comprises the linear guide and is configured to support the carriage that comprises the linear guide; and
a drive subassembly configured to apply an X-directional force to move the carriage along the linear guide in the X direction.

9. The system of claim 1, wherein the carriage is configured to support a robotic mechanism for picking and placing media cartridges in magazines of a storage library.

10. The system of claim 1, wherein the linear guide comprises a magnetic material.

11. The system of claim 1, wherein the biaser comprises a permanent magnet.

12. The system of claim 1, wherein the linear guide is a metal guide rail having a substantially constant cross-section.

13. A method for selectively biasing a carriage, the method comprising:
moving a carriage in an X direction to a desired X location with respect to a platform, the platform having a linear guide and the carriage having an alignment feature configured to form a relatively low-tolerance engagement between the carriage and the linear guide while the carriage is traveling along the linear guide in the X direction, such that the carriage is supportively engaged in adjacent contractable relation with the linear guide in a Z direction and is permitted to float relative to the linear guide in a Y direction, the X, Y, and Z directions being orthogonal to each other; and
upon reaching the desired X location, magnetically shifting the carriage in the Y direction relative to the guide means and magnetically coupling the carriage with the linear guide in such a way that forms a relatively high-tolerance engagement between the carriage and the linear guide to park the carriage in a substantially fixed position relative to the linear guides when the carriage is not traveling along the linear guide in the X direction.

14. The method of claim 13, wherein:
magnetically coupling the carriage with the linear guide comprises exerting a magnetic force between the carriage and the linear guide that is strong enough to automatically form the relatively high-tolerance engagement between the carriage and the linear guide while the carriage is not traveling along the linear guide in the X direction, but weak enough to disengage the relatively high-tolerance engagement when an X-directional force is applied to move the carriage in the X direction.

15. The method of claim 13, further comprising:
disengaging the relatively high-tolerance engagement between the carriage and the linear guide by applying an X-directional force to the carriage to overcome the magnetic coupling.

16. The method of claim 13, wherein:
magnetically coupling the carriage with the linear guide comprises actuating an electromagnet to exert a magnetic force between the carriage and the linear guide that is strong enough to form the relatively high-tolerance engagement between the carriage and the linear guide.

17. The method of claim 16, wherein:
actuating the electromagnet comprises increasing the magnetic force to be strong enough to form the relatively high-tolerance engagement between the carriage and the linear guide.

18. The method of claim 16, further comprising:
detecting when the carriage has reached the desired X location; and
actuating the electromagnet in response to the detecting that the carriage has reached the desired X location.

19. The method of claim 13, further comprising:
disengaging the relatively high-tolerance engagement between the carriage and the linear guide by decreasing the magnetic force to effectively decouple the relatively high-tolerance engagement between the carriage and the linear guide.

20. A system for selectively biasing a carriage, the system comprising:
guide means; and
carriage means for transporting a mechanism along the guide means in an X direction, the carriage means comprising:
alignment means for forming a relatively low-tolerance engagement between the carriage means and the guide means while the carriage is traveling in the X direction, such that the carriage means is supportively engaged in adjacent contactable relation with the guide means in a Z direction and is permitted to float relative to the guide means in a Y direction, the X, Y, and Z directions being orthogonal to each other; and
biasing means for magnetically shifting the carriage means in the Y direction relative to the guide means, thereby magnetically forming a relatively high-tolerance engagement between the carriage means and the guide means to park the carriage means in a substantially fixed position relative to the guide means when the carriage means is not traveling in the X direction.

* * * * *

UNITED STATES PATENT AND TRADEMARK OFFICE
CERTIFICATE OF CORRECTION

PATENT NO. : 9,174,621 B2  
APPLICATION NO. : 13/460639  
DATED : November 3, 2015  
INVENTOR(S) : Manes Page 1 of 1

It is certified that error appears in the above-identified patent and that said Letters Patent is hereby corrected as shown below:

In the Specification

In column 4, line 67, delete "and or" and insert -- and/or --, therefor.

In column 5, line 50, delete "10" and insert -- IO --, therefor.

In column 5, line 60, delete "and or" and insert -- and/or --, therefor.

In the Claims

In column 15, line 54, in claim 13, delete "contractable" and insert -- contactable --, therefor.

Signed and Sealed this  
Twenty-eighth Day of June, 2016

Michelle K. Lee  
*Director of the United States Patent and Trademark Office*